United States Patent
Pleasant et al.

(10) Patent No.: US 6,168,415 B1
(45) Date of Patent: Jan. 2, 2001

(54) BAFFLE

(75) Inventors: Ronald E. Pleasant, Kenton; H. Eugene Lafferty, Belle Center, both of OH (US)

(73) Assignee: Pleasant Precision, Inc., Kenton, OH (US)

( * ) Notice: Under 35 U.S.C. 154(b), the term of this patent shall be extended for 0 days.

(21) Appl. No.: 09/184,367

(22) Filed: Nov. 2, 1998

Related U.S. Application Data

(62) Division of application No. 08/716,506, filed on Sep. 18, 1996, now Pat. No. 5,830,515.

(51) Int. Cl.⁷ .................................................. B29C 45/73
(52) U.S. Cl. ............................. 425/552; 138/38; 138/42; 249/79; 425/192 R
(58) Field of Search ................................... 425/547, 552, 425/190, 192 R; 249/79; 138/38, 40, 42

(56) References Cited

U.S. PATENT DOCUMENTS

| | | | |
|---|---|---|---|
| 2,688,986 | * 9/1954 | O'Brien | 138/42 |
| 3,692,064 | * 9/1972 | Hohnerlein et al. | 138/42 |
| 3,924,653 | * 12/1975 | Bendixen | 138/42 |
| 4,200,149 | * 4/1980 | Pechner | 138/42 |
| 4,828,479 | 5/1989 | Pleasant | 425/192 R |
| 4,959,002 | 9/1990 | Pleasant | 425/192 R |
| 4,966,544 | 10/1990 | Mitake | 425/552 |
| 5,053,200 | * 10/1991 | Schaeffer et al. | 138/42 |
| 5,261,806 | 11/1993 | Pleasant | 425/144 |
| 5,647,114 | 7/1997 | Pleasant | 425/192 R |

FOREIGN PATENT DOCUMENTS

| | | |
|---|---|---|
| 3-124420 | 5/1991 | (JP) . |
| WO 94/09961 | 5/1994 | (WO) . |

OTHER PUBLICATIONS

P. L–17 of 1986 Product Catalog, published by D–M–E Company, Madison Heights, MI, 1986.

Front sheet and p. D–13 for Dec. 1995 Price List published by PCS Company, Fraser, MI, Dec. 1995, admitted to show prior art baffle.

* cited by examiner

Primary Examiner—Robert Davis
Assistant Examiner—Joseph Leyson
(74) Attorney, Agent, or Firm—Roger S. Dybvig

(57) ABSTRACT

A mold insert for an injection molding machine has a circumferential liquid conduit groove and a plurality of liquid-receiving bores extending inwardly from the groove. Baffles are removably inserted into the liquid-receiving bores and have heads located in locking engagement with the sidewalls, including the undercut portions thereof, to retain the baffles in their respective liquid-receiving bores. Each baffle has a blade that fits snugly within a liquid-receiving bore to separate the liquid-receiving bore into a liquid inlet passageway and a liquid outlet passageway. Fins project outwardly from opposite faces of the blade to create turbulence in liquid flowing into and out of the liquid-receiving bore, which enhances cooling (or heating) of the mold insert. The baffle is also useful with other solid components having a liquid conduit for cooling purposes and a transverse liquid-receiving bore intersecting the liquid conduit. An improved liquid barrier for use in preventing the flow of liquid in the liquid conduit groove is formed by a dam member substantially identical to the head of a baffle.

9 Claims, 4 Drawing Sheets

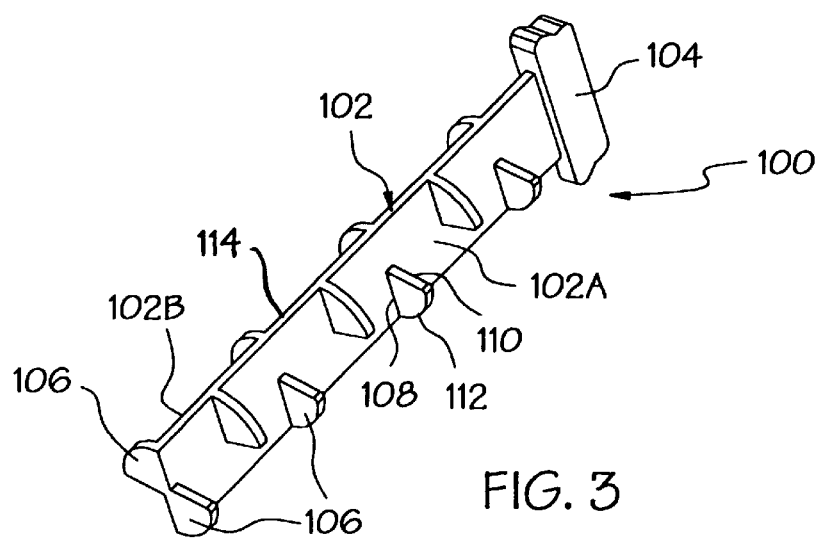
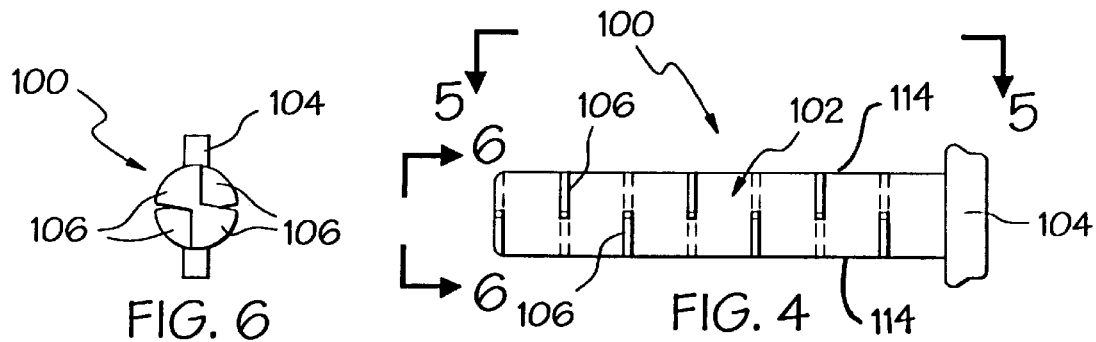
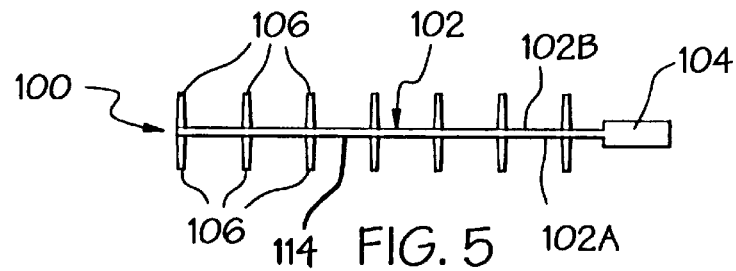
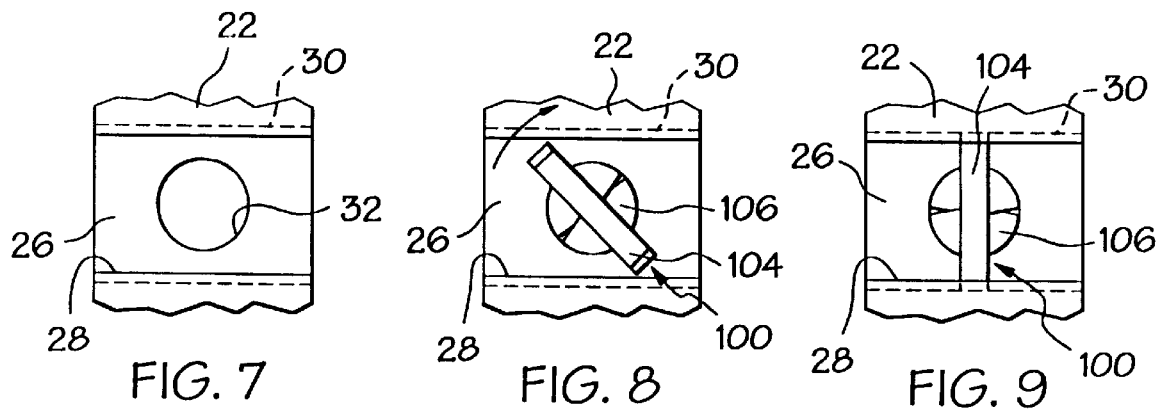

BAFFLE

CROSS REFERENCE TO RELATED APPLICATION

This application is a division of copending Application Ser. No. 08/716,506, filed Sep. 18, 1996, now U.S. Pat. No. 5,830,515, dated Nov. 3, 1998.

FIELD OF THE INVENTION

This invention relates to an improved mold insert and an improved baffle for use therewith. This invention also relates to an improved liquid barrier for use in a mold insert. Mold inserts of the type to which this invention pertains are used in machines for injection molding plastic workpieces, but this invention may be useful in other fields, such as die casting and rubber molding.

BACKGROUND OF THE INVENTION

This invention is intended for use with mold inserts of the type shown in U.S. Pat. No. 4,828,479, granted May 9, 1989 to Ronald E. Pleasant, and U.S. Pat. No. 4,959,002, granted Sep. 25, 1990 to Ronald E. Pleasant, the disclosures of which are hereby incorporated herein by reference. The '479 and the '002 patents disclose generally cylindrical mold inserts for injection molding machines which have a generally cylindrical liquid channel section with a liquid conduit groove extending circumferentially around the liquid channel section. A liquid, such as water, is circulated around the mold insert in the liquid conduit groove for cooling (or heating) portions of the mold insert. A liquid barrier is located in the groove so that the groove is double-ended, one end constituting a liquid inlet end and the other end constituting a liquid outlet end. A mold machine with which an insert is used has inlet and outlet connectors aligned with the inlet and the outlet ends of the groove so that the water or other liquid can be introduced into the liquid conduit groove.

It is known in the art to provide blind bores, by drilling for example, that extend radially inwardly from the liquid conduit groove and receive liquid to meet various cooling (or heating) needs. A simple baffle comprising a flat blade fitted to the diameter of a liquid-receiving bore may be inserted centrally therein to separate the bore into an inlet passageway and an outlet passageway. Typically, the blade is formed from brass, aluminum, or stainless steel, and a portion of the blade extends into the liquid conduit groove to divert liquid flowing in the groove into the inlet passageway formed by the blade. The blade does not extend to the bottom of the bore so that liquid diverted into the inlet passageway of the bore may flow around the bottom of the blade to the outlet passageway and back into the liquid conduit groove.

A simple, blade-only baffle, as described above, has a tendency to move or shift from its central position in the liquid-receiving bore due to pressure from the flowing liquid. This shifting of the baffle within the bore can create imbalanced flow characteristics which negatively impact the cooling (or heating) action provided by use of the baffle. To prevent shifting of the baffle within the bore, a so-called "spiral" baffle may be used in place of a blade-only baffle. A spiral baffle remains centered within its bore due to the body thereof having a generally cylindrical shape that fits snugly within the bore, thereby providing multiple circumferential engagement points with the bore. Spiral baffles also provide better cooling (or heating) action than straight baffles as a result of longer passageways for the liquid flowing through the bore created by use of a pair of drill-like, helical or spiral grooves in the baffle body. The helical or spiral grooves result in a spiral liquid inlet passageway and a spiral liquid outlet passageway in the liquid-receiving bore. The spiral baffle is similar to a straight baffle in that it does not extend to the bottom of the liquid-receiving bore. Therefore, liquid diverted into the bore may flow into the spiral inlet passageway and out of the spiral outlet passageway. A similar effect has been obtained by twisting a simple, blade-only baffle to create a longer, spiral path for the liquid.

Such prior art baffles, although commonly used, are not particularly suited for use with mold inserts of the type shown in the aforementioned '479 and '002 patents because no suitable way to positively secure the baffles into the liquid-receiving bores of mold inserts was heretofore known. The prior art baffles are typically retained in the bores merely by the frictional engagement of the baffle with the bore. In addition, although prior art baffles provide generally acceptable cooling (or heating) action, better cooling (or heating) action is desired.

The liquid barrier mentioned above is typically formed by a dam member that is either welded in place in the liquid conduit groove or is secured in the liquid conduit groove by the use of a pair of locking members that are advanced through a pair of outwardly-extending bores in the dam member and into engagement with the inwardly-facing surfaces of undercut portions of the groove sidewall, as illustrated and described in commonly owned international application, International Publication Number WO 94/09961, published May 11, 1994, and U.S. patent application Ser. No. 08/387,250, filed Feb. 13, 1995, now U.S. Pat. No. 5,647,114, which are hereby incorporated herein by reference.

In addition to or in place of the liquid-receiving bores described above, the user of a mold insert may, in order to meet various cooling (or heating) needs, drill liquid passageways extending inwardly of the circumferentially-extending liquid conduit groove and opening at mutually-spaced locations in the liquid conduit groove. To insure an adequate flow of liquid into such inwardly directed passageways, one or more additional dams or barriers are affixed inside the peripheral liquid conduit groove between the mutually-spaced openings of each liquid passageway. The provision of additional dams or barriers, by either welding or the use of locking members as described above, can be time consuming and costly. Accordingly, there exists a need to enable the user of an insert to quickly, accurately and securely assemble liquid dams or barriers into liquid conduit grooves of mold inserts.

SUMMARY OF THE INVENTION

An object of this invention is to provide an improved baffle for use in cooling (or heating) solid components, such as mold inserts for injection molding machines, by passing a liquid therethrough. A more particular object is to provide such an improved baffle wherein turbulence is created in the liquid flowing around or past the baffle to enhance the cooling (or heating) action of the liquid.

Another object of this invention is to provide an improved baffle particularly suited for use in mold inserts for injection molding machines. More particularly, an object of this invention is to provide a self-retaining baffle for use in a mold insert that is readily secured in and removed from a liquid-receiving bore provided in the mold insert.

A further object of this invention is to provide a baffle in accordance with the foregoing objects that is durable and that can be easily and inexpensively manufactured.

Another object of this invention is to provide a baffle that achieves the foregoing objects which can be used with existing mold inserts without modification thereto.

Still another object of this invention is to provide an improved mold insert and a method for assembling the same wherein baffle members provided in liquid-receiving bores are self-retaining and are easily locked into and removed from the liquid-receiving bores.

An improved baffle in accordance with this invention includes a flat blade adapted to be snugly received in a liquid receiving bore which extends transverse to a liquid conduit, for example in a mold insert. The blade separates the bore into an inlet passageway and an outlet passageway, but does not extend to the bottom of the bore. A portion of the baffle, which may be termed the head thereof, extends into the path of liquid flowing in the liquid conduit so that the liquid is diverted into and through the liquid-receiving bore. The baffle has plural fins projecting outwardly from opposite sides thereof into the inlet and outlet passageways. Liquid flowing in the passageways is partially obstructed by the fins, thereby creating turbulence in the liquid.

When used in a mold insert having an outwardly-open peripheral or circumferential liquid conduit groove, the baffle preferably has a head that blocks the flow of liquid in the groove and diverts the flow into the liquid-receiving bore. Because the bore is typically of a diameter smaller than the width of the liquid conduit, the head and blade of the baffle typically form a T-shape. The liquid conduit groove has sidewalls that are preferably provided with undercut portions extending alongside the opening of the liquid-receiving bore. The baffle may be first inserted into the liquid-receiving bore so that its head does not engage the groove sidewalls. After the baffle is fully received in the liquid-receiving bore, the baffle is rotated until the baffle head engages the groove sidewalls, including the undercut portions thereof, thereby locking the baffle into position in the liquid-receiving bore.

The head of the baffle may be solid, in which case the baffle is rotationally held in place by simple frictional engagement of the head with the undercuts. Alternatively, the head may include hollowed-out portions or recesses that give the head resilient characteristics. The recesses are collapsed by the engagement of the head with the groove sidewalls as the head is rotated. When the baffle is fully rotated into position, the resiliency of the head serves to clamp the baffle in place. The baffle may also be driven into place, without rotation, by use of a suitable tool such as a hammer.

Each of the baffle fins is preferably wedge-shaped and is aligned longitudinally with a corresponding wedge-shaped fin projecting from the opposite face of the baffle blade. The longitudinally-aligned fins have outer margins that extend from opposite side edges of the baffle blade. Similarly, the outer margins of mutually-spaced, adjacent fins on each face of the baffle blade extend from respectively opposite side edges of the baffle blade. The fins are not as wide as the baffle blade, and the mutually-spaced, adjacent fins on each side of the baffle blade are laterally offset from one another.

Each fin is preferably shaped so that the outer margin thereof snugly engages the wall of the liquid-receiving bore. For typical cylindrical liquid-receiving bores, each of the fins has an arcuate outer margin that engages the wall of the liquid-receiving bore, although other bore arrangements may dictate the use of linear wall-engaging outer margins.

Other objects and advantages will become apparent from the following description and the accompanying drawings.

BRIEF DESCRIPTION OF THE DRAWINGS

FIG. 3 is a perspective view of the baffle in accordance with this invention illustrated in FIG. 1.

FIG. 4 is a side view of the baffle.

FIG. 5 is an edge view of the baffle as viewed in the direction of arrows 5—5 of FIG. 4.

FIG. 6 is an end view of the baffle as viewed in the direction of arrows 6—6 of FIG. 4.

FIG. 7 is a fragmentary side view as viewed in the direction of arrows 7—7 of FIG. 1 showing a liquid-receiving bore in the mold insert before a baffle is assembled into the mold insert.

FIG. 8 is a fragmentary side view similar to FIG. 7, but showing an initial stage of the assembly of a baffle into the mold insert.

FIG. 9 is a view similar to FIG. 8, but showing a later stage of the assembly process. FIG. 9 is the equivalent of a fragmentary side view as viewed in the direction of arrows 8—8 of FIG. 1.

DETAILED DESCRIPTION

Figure 1:
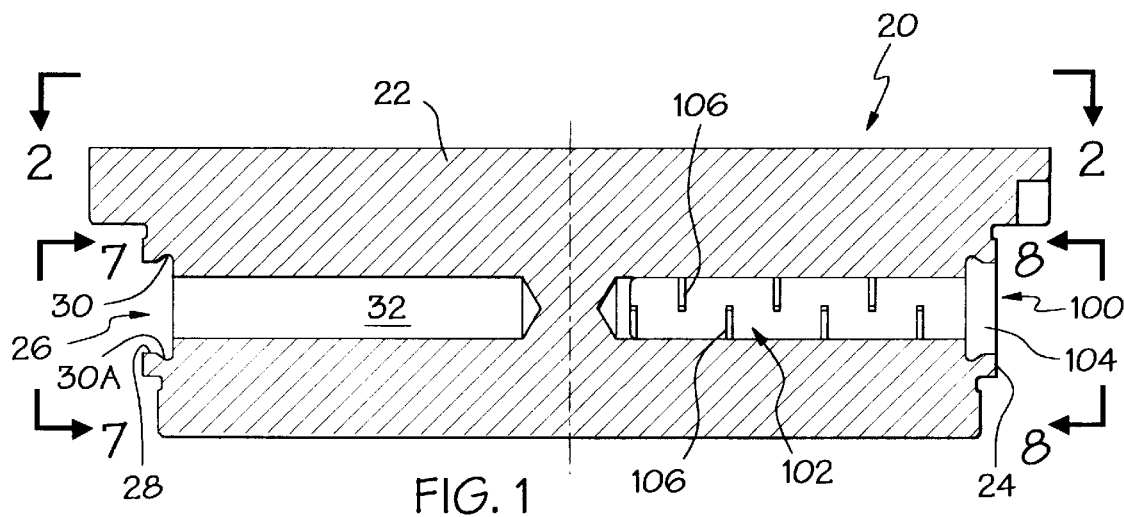
FIG. 1 is sectional view of an improved mold insert in accordance with this invention taken along line 1—1 of FIG. 2 and showing a baffle in accordance with this invention secured in a liquid-receiving bore in the mold insert.
Figure 2:
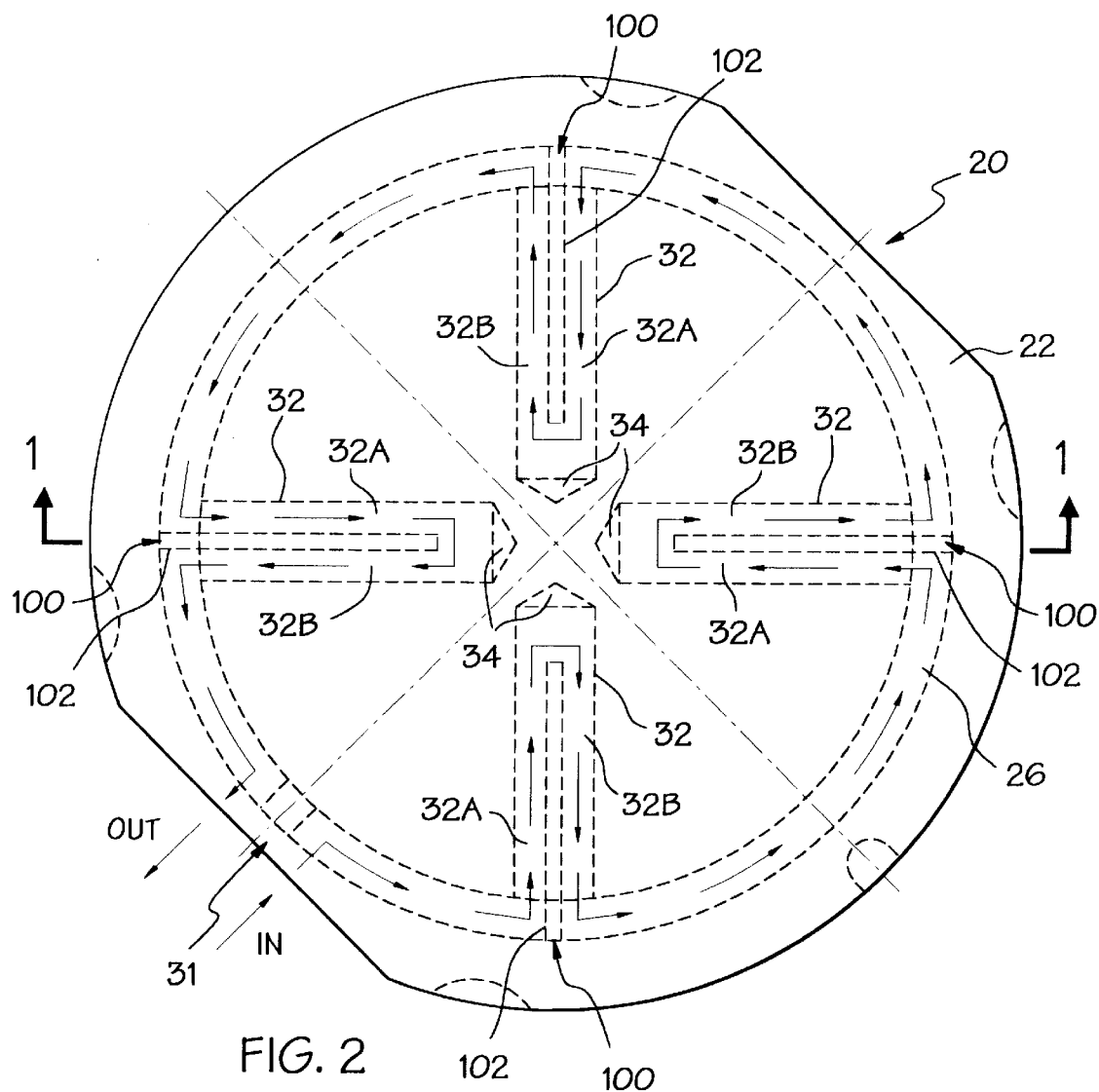
FIG. 2 is a simplified, partially-diagrammatic end view of the mold insert of FIG. 1 as viewed in the direction of arrows 2—2 of FIG. 1.

With reference to FIGS. 1 and 2, this invention is directed to an improved mold insert, generally designated 20, for use in an injection molding machine (not shown) and an improved baffle therefor, generally designated 100. The mold insert 20 may be constructed substantially in accordance with the '479 and '002 patents mentioned above, but is modified as will be described below.

The mold insert 20, which may be formed from tool steel or a non-ferrous metal, such as aluminum, has a generally cylindrical shape and includes a one-piece body 22 having a cylindrical liquid conduit section 24. Although the mold insert 20 may have other than a cylindrical shape, further description herein is directed to a cylindrical mold insert 20. A peripheral or circumferential liquid conduit groove 26 is provided in the liquid conduit section 24 extending 360 degrees therearound, and as is well known, a liquid such as water is directed into the liquid conduit groove 26 and flows therearound to cool (or heat) the mold insert 20. As shown in FIG. 1, the liquid conduit groove 26 has opposed sidewalls 28, each of which has a recess or undercut 30 extending along the entire length of the groove 26.

Referring to FIG. 2, a barrier or dam assembly, generally designated 31, is inserted into the liquid conduit groove 26 to substantially block the flow of liquid in the liquid conduit groove 26, thereby rendering the groove 26 double-ended. The dam assembly 31 corresponds to the barrier section illustrated and described in the aforementioned '479 and '002 patents. The dam assembly 31 may be secured into the liquid conduit groove 26 in accordance with prior art methods, such as illustrated and described in the aforementioned international application, International Publication Number WO 94/09961, published May 11, 1994, or other known locking techniques, such as welding, might be used. However, it is contemplated that certain aspects of the baffles in accordance with this invention will be useful in creating improved liquid barriers, as will be described below in further detail.

With continued reference to FIGS. 1 and 2, four blind bores 32, hereafter referred to as liquid-receiving bores 32, are provided in the mold insert 20 and extend radially-inwardly from the liquid conduit groove 26 transverse thereto. As is evident from the drawings, the liquid receiving bores 32 open at circumferentially-spaced locations along the base of the liquid conduit groove 26. FIG. 2 illustrates the preferred embodiment of this invention wherein four liquid-receiving bores 32 are provided—one for each quadrant of the mold insert 20. However, another number of liquid-receiving bores 32 may be provided, depending on the desired cooling (or heating) action and the size of the mold insert 20 and the liquid-receiving bores 32.

The liquid-receiving bores 32 are preferably formed in the mold insert 20 by drilling, but may be formed in any other suitable manner. When the liquid-receiving bores 32 are provided by drilling, the bores 32 are typically cylindrical but do have drill points 34 formed at the base thereof. Although not necessary, the liquid-receiving bores 32 are typically identical to one another. Therefore, further discussion of this invention will be limited to a single liquid-receiving bore 32, such discussion being equally applicable to each liquid-receiving bore 32.

FIG. 1 illustrates the mold insert 20 with a baffle 100 secured in a liquid-receiving bore 32. Four baffles 100 are illustrated diagrammatically in FIG. 2. With reference also to FIGS. 3 through 6, the baffle 100 is preferably formed from molded nylon, which is capable of withstanding temperatures on the order of 250 to 275 degrees fahrenheit, although it is contemplated that the baffle 100 may be formed from a suitable plastic material using a thermal set technique whereby hot plastic is injected into a cooled mold. The baffle 100 includes a flat blade 102 that is inserted into the liquid receiving bore 32, the blade 102 being substantially the same width as a diameter of the liquid-receiving bore 32 so that the blade, when inserted into the bore 32, separates the liquid-receiving bore 32 into an inlet passageway 32A and an outlet passageway 32B. Preferably, the blade 102 terminates near the bottom of the bore 32, but does not extend to the bottom of the bore 32. As a result, clearance is provided between the radially-inward end of the blade 102 and the bottom of the liquid-receiving bore 32.

The baffle 100 also includes a head 104, which may be integrally formed with the blade 102 to create a T-shape, that is located within the liquid conduit groove 26. The head 104 of the baffle 100 is so sized and shaped that it matches the cross section of the liquid conduit groove 26 to substantially block the flow of liquid therein. As a result, liquid flowing in the liquid conduit groove 26 is diverted into the inlet passageway 32A formed in the liquid-receiving bore 32, as illustrated diagrammatically in FIG. 2. The diverted liquid flows radially-inwardly through the inlet passageway 32A, through the clearance provided at the bottom of the bore 32, radially-outwardly through the outlet passageway 32B formed in the liquid-receiving bore 32, and back into the liquid conduit groove 26. As evident from FIG. 2, this diversion of liquid flow occurs at each liquid-receiving bore 32.

With particular reference to FIGS. 5 and 6, the head 104 is slightly thicker than the blade 102. The additional thickness of the head 104 provides additional rigidity, which is useful in locking the baffle 100 into position. In a constructed embodiment, the head 104 was three times as thick as the blade 102, with the blade being centered on the head. Particularly, the blade was 0.05" thick with a head 0.150" thick. Thus, the head projected 0.05" on either side of the blade 102. of course, this additional thickness of the head 104, although preferred, is not necessary for operation of the baffle 100.

Referring to FIGS. 1 and 3 through 6, the baffle 100 creates turbulence in the liquid flowing through the liquid-receiving bore 32 by use of plural fins 106 projecting outwardly from respectively opposite faces 102A and 102B of the blade 102. The fins 102 create turbulence in the liquid flowing through the liquid-receiving bore 32 by partially obstructing the flow of liquid through the inlet passageway 32A and the outlet passageway 32B.

Referring particularly to FIG. 5, each fin 106 projecting from a face 102A of the blade 102 is aligned longitudinally along the blade 102 with a fin 106 projecting from the opposite face 102B of the blade 102, and vice versa, each of the fins 106 tapering or decreasing slightly in thickness as it extends from a face 102. Preferably, the fins 106 are each wedge-shaped, as best shown in FIGS. 3 and 6, but fins of other shapes may be used without departing from this invention. With particular reference to FIG. 3, each fin 106 has three margins, namely first and second linear margins 108 and 110, respectively, and a third, outer margin 112, which may be arcuate, as will be described below.

The first linear margin 108 of each fin 106 projecting from the face 102A extends inwardly from a side edge of the blade 102 parallel with the face 102A and is connected thereto. The second linear margin 110 of each fin 106 extends outwardly from the face 102A of the blade 102. The third or outer margin 112 of each fin 106 extends from the intersection of the first linear margin 108 thereof with a side edge 114 of the blade 102 to the second linear margin 110 thereof to form a wedge shape. Techniques for molding the baffle 100 typically require the second linear margin 110 to extend at an angle slightly less than normal to the face of the blade 102, as shown in FIG. 6. For example, an angle of approximately 80 degrees has been found to be acceptable to meet typical molding requirements.

The fins 106 projecting from the opposite face 102B of the blade 102 are formed in a manner substantially identical to that described above with regard to the fins 106 projecting from the face 102A of the blade 102.

With continued reference to FIGS. 3 through 6, the third or outer margin of respectively aligned fins 106 on opposite faces of the blade 102 extend from respectively opposite side edges 114 of the blade 102. In addition, the fins projecting from a given face of the blade 102 are located at mutually-spaced locations thereon, and the third or outer margins of mutually-spaced, adjacent fins 106 on the given face of the blade 102 extend from respectively opposite side edges 114 thereof. In other words, the third or outer margins of the fins 106 on a given face of the blade 102 extend from alternating side edges 114 thereof from one fin 106 to the next.

Referring particularly to FIGS. 3 and 4, the first linear margin 108 of each of the fins 106 extends inwardly from its respective side edge 114 of the blade 102 across only a fraction of the width of the blade 102. Preferably, this fraction is more than ½ of the width of the blade 102 so that little or no straight, continuous path is available for liquid flowing through either the inlet passageway 32A or the outlet passageway 32B.

The illustrated baffle 100 includes seven fins 106 projecting from each face 102A and 102B of the blade 102. The number of fins 106 projecting from each face 102A and 102B may vary, depending on the length of the blade 102. However, the longitudinal spacing between fins 106 is preferably the same from one baffle to the next, regardless of the number of fins 106, to permit water to flow around the fins 106. For example, a longitudinal spacing of 0.39" has been found satisfactory in testing to create sufficient turbulence in the liquid flowing through the liquid-receiving bores 32. It is contemplated that baffles 100 of a single length will be manufactured for several applications and that users will cut the baffles 100 to the proper length for their application, depending on the depth of the liquid receiving bores 32.

With reference to FIGS. 1 and 7, the liquid receiving bore 32 is typically cylindrical, as a result of being formed by drilling. So that the baffle 100 fits snugly within the bore 32, the third or outer margin of each fin is preferably convexly arcuate, as shown in FIGS. 3 and 6, to match the curvature of the wall of the bore 32. When the baffle 100 is inserted into the bore 32, the arcuate outer margins 112 of each fin engages the wall of the bore 32 to not only provide a snug fit, but also to ensure that the flow of liquid through the bore 32 is partially obstructed to create the desired turbulence. In addition, the cylindrical bore 32 and the arcuate outer margins 112 of the fins 106 facilitate rotation of the baffle 100 within the bore 32, for reasons which will be described below.

As best shown in FIG. 7, the liquid-receiving bore 32 typically has a circular cross-section, although it may be of other geometric shapes. When viewing the baffle 100 from an end, as in FIG. 6, a pair of adjacent fins 106 projecting from the face 102A of the blade 102 and the respectively aligned fins 106 projecting from the opposite face 102B of the blade 102, along with the blade 102, appear to substantially form a circle having a diameter substantially equal to the diameter of the liquid-receiving bore 32. This is due, in part, to the arcuate outer margins 112 of the fins 106. Of course, the bore may have a geometric cross-sectional shape that would require linear, rather than arcuate outer fin margins 112 to match the cross-section of the liquid-receiving bore 32.

Referring now to FIG. 1, the head 104 of the baffle 100 is shaped and sized to match the cross-section of the liquid conduit groove, including the undercuts 30. Thus, the top or radially-outer portion of the head has side margins which match the non-undercut portions of the liquid conduit groove 26. The bottom or radially-inner portion of the head 104 is wider than the top portion of the head 104 to match the undercut portions of the groove 26, and has sloping side margins that conform to inwardly-facing surfaces 30A of the undercuts 30. The side margins of the head 104 slope at the same angle as the undercuts relative to the groove sidewall 28. Because the bottom portion of the head 104 matches the undercut portions of the groove 26, the head 102 of the baffle 100 is wider, at least in part, than the radially-outward opening of the liquid conduit groove.

With reference to FIGS. 8 and 9, a baffle 100 is assembled into the mold insert 20 by first advancing the blade 102 of the baffle 100 into a liquid-receiving bore 32 until the bottom surfaces of the baffle head 104 contact the bottom wall of the liquid conduit groove 26. Because the baffle head is wider than the top or radially-outermost portion of the groove 26, the baffle 100 must be advanced with the head 104 thereof oriented to extend across the liquid conduit groove at an angle other than ninety degrees relative to the groove sidewalls 28, as best shown in FIG. 8. For example, an angle of 45 degrees relative to the groove sidewall 28 is sufficient to permit the baffle head 104 to engage the bottom wall of the groove 26. After the head 104 of the baffle 100 engages the base of the liquid conduit groove 26, the baffle 100 may be rotated until the baffle head 104 extends across the liquid conduit groove perpendicular to the sidewalls 28 thereof, as shown in FIG. 9. This locates the baffle 100 as shown in FIG. 1.

Rotation of the baffle 100 to the position shown in FIG. 9 causes the inwardly sloping side margins of the baffle head 104 to move under and into locking engagement with the inwardly-facing surfaces 30A of the undercuts 30 in the groove sidewalls 28. As a result, radial movement of the baffle 100 from the liquid receiving bore is prevented. Frictional engagement between the head 104 and the groove sidewalls 28, including the undercuts 30, prevents rotation of the baffle 100. Thus, the baffle 100 is locked in position within the liquid-receiving bore 32. When necessary, the baffle 100 may be readily removed by performing the above-described steps in reverse. For insertion and removal, the baffle 100 may be rotated by hand or by use of a pliers-like gripping tool, such as common "needle nose" pliers.

It is also contemplated that a baffle 100 may be locked into position in the liquid conduit groove 26 by striking the baffle 100 with a suitable tool, such as a rubber mallet or hammer (not shown). In this case, the baffle 100 is inserted into a liquid-receiving bore 32 with the head 104 thereof oriented to extend perpendicularly across, but not in, the groove 26. A machinist or other person assembling the mold insert 20 would then strike the head 104 of the baffle 100 with the rubber mallet or hammer to advance the baffle 100 into the liquid-receiving bore 32 without rotation, thereby causing the inwardly sloping side margins of the head 104 to snap into place under and in engagement with the undercuts 30.

Figure 10:
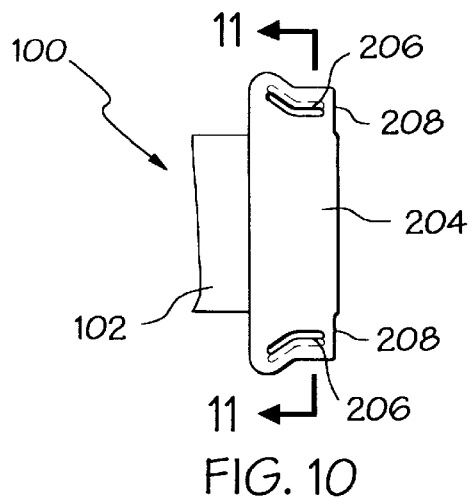
FIG. 10 is an enlarged, fragmentary side view of a second embodiment of the baffle of FIG. 1 showing a modified head thereof.
Figure 11:
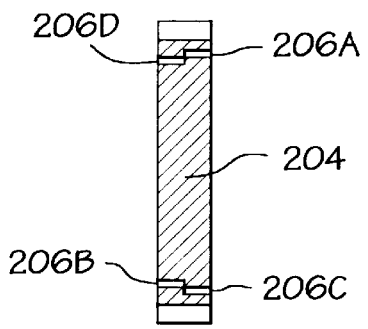
FIG. 11 is a sectional view as viewed in the direction of arrows 11—11 of FIG. 10.

With reference to FIGS. 10 and 11, an alternate embodiment of the baffle head is illustrated therein and generally designated 204. A baffle utilizing the head 204 is assembled into the mold insert 20 in a manner substantially identical to that described above with regard to the baffle 100 having a head 104. However, use of the alternate baffle head 204 provides improved locking characteristics, especially with respect to rotational movement of the baffle 100.

The baffle head 204 is substantially identical to the baffle head 104 described above, except for the addition of hollowed-out portions or recesses 206 provided therein. Four recesses 206A, 206B, 206C, and 206D are provided, two in each face of the head 204 adjacent respectively opposite side margins thereof. As evident from FIG. 11, the recesses 206A and 206C are formed in one face of the head 204, and the recesses 206B and 206D are formed in the opposite face. The recesses 206 cause the outermost portions of the head 204 to be resilient in that they spring back when compressed.

Figure 12:
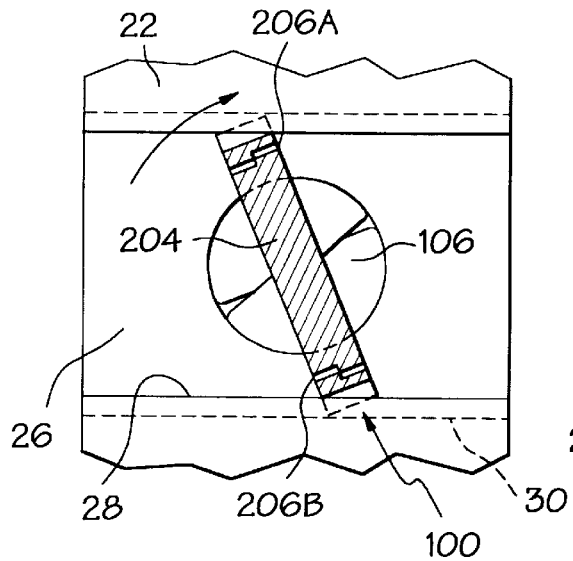
FIGS. 12 and 13 are views somewhat similar to FIGS. 8 and 9 and illustrate the second embodiment of the baffle during the assembly of the baffle into a mold insert.
Figure 13:
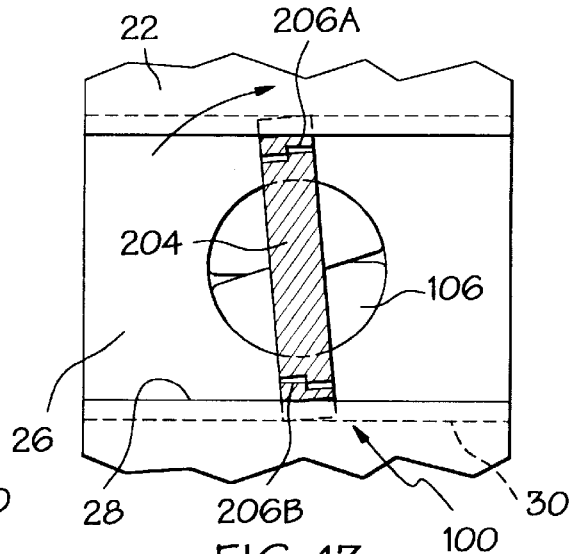

FIGS. 12 and 13 illustrate two successive stages of the assembly of a baffle 100 having a head 204 into the mold insert 20. In FIG. 12, the baffle 100 has been rotated so that the head 204 thereof has just engaged the sidewalls 28 of the liquid conduit groove 26. As the baffle 100 is further rotated, as shown in FIG. 13, the material forming the baffle head 204 around the recesses 206A and 206B further engages the sidewalls 28 and is pushed inwardly to compress around the recesses 206A and 206B. When the baffle 100 is fully rotated to the orientation shown in FIGS. 9 and 14, the resiliency provided by the recesses 206 clamps the baffle 100 into place and inhibits rotation of the baffle 100.

With particular reference to FIG. 11, the recesses 206 each have a depth substantially equal to half the thickness of the head 204. To avoid creating slots or passageways through the head 204, the recesses 206A and 206C are offset from the recesses 206D and 206B, respectively. Without this offset, passageways in the head 204 would be created by the recesses 206, and water flowing in the liquid conduit groove 26 would flow through the passageways, which is undesirable.

Figure 14:
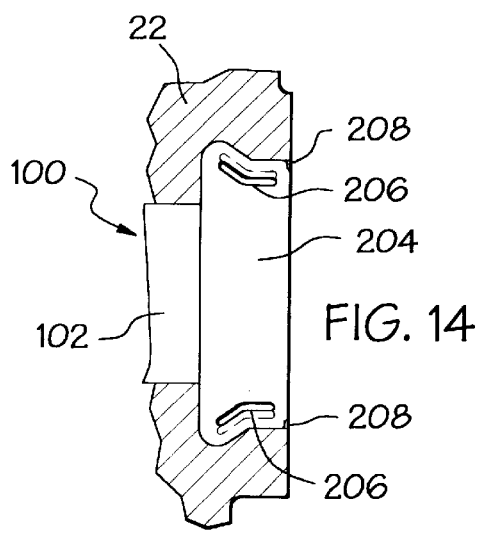
FIG. 14 is a fragmentary, sectional view somewhat similar to FIG. 1 showing the second embodiment of the baffle locked in place in the mold insert.

Referring to FIG. 10, the head 204 has reliefs 208 at each margin of the top thereof above the recesses 206. As the baffle 100 is rotated into position, the material around the recesses 206 is likely to bulge outwardly of the liquid conduit groove 26 as well as being compressed around the recesses 206. The reliefs 208 permit such outward bulging to occur without any part of the baffle 100 bulging above the raised center of the head 204, as shown in FIG. 14. Thus, the baffle head 204 fits entirely within the liquid conduit groove 26 when the baffle 100 is in place within the groove 26.

As will be apparent to one skilled in the art, the above-described techniques and construction for locking the baffle in place is equally applicable to straight baffles and spiral baffles. In addition, one skilled in the art will recognize that a single undercut 30 on one of the sidewalls 28 may, in certain cases, be sufficient to retain the baffle 100. In such instances, the head 104 of the baffle 100 need have only one inwardly sloping side margin movable into engagement with an undercut 30. The opposite side margin of the head 104 may then conform to the opposite, non-undercut side wall 28 of the groove 26.

Figure 15:
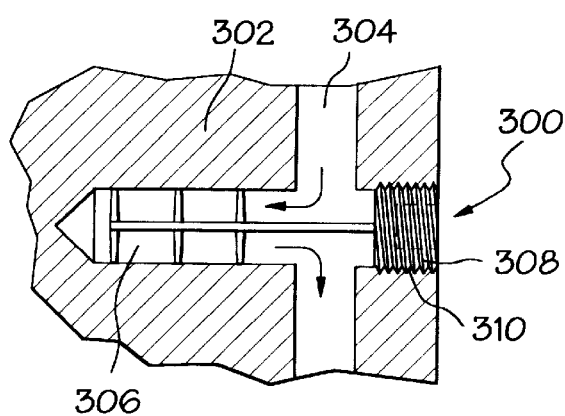
FIG. 15 is a fragmentary, sectional view of a generic solid component being cooled (or heated) by a process utilizing a baffle in accordance with this invention.

One skilled in the art to which this invention pertains will also recognize that baffles in accordance with this invention are useful in fields other than injection molding to cool (or heat) solid components other than mold inserts. In fact, baffles in accordance with this invention may be useful in any situation where a solid component is to be cooled (or heated) by liquid flowing through a liquid conduit therein. FIG. 15 illustrates a threaded baffle 300 in accordance with this invention used to enhance the cooling (or heating) of a generic solid component 302 having a liquid conduit 304 passing therethrough for cooling (or heating) purposes and a transverse bore 306 intersecting the conduit 304. In such instances, the baffle 300 may be used in place of typical, prior art straight baffles or spiral baffles. The baffle 300 may be secured in the bore 306 by any suitable, known means, such as the illustrated threaded or so-called pipe plug-type head 308 and tapped bore segment 310 or by press-fitting the head into the bore, among other alternatives known in the art.

Figure 16:
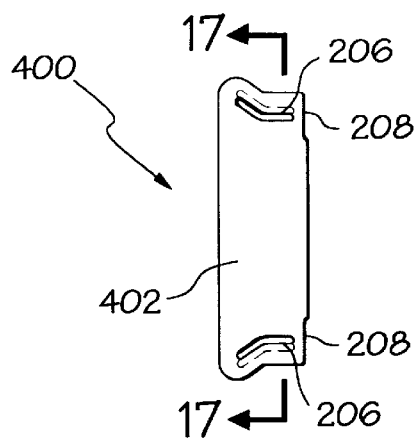
FIG. 16 is a side elevational view of a third embodiment of a baffle in accordance with this invention.
Figure 17:
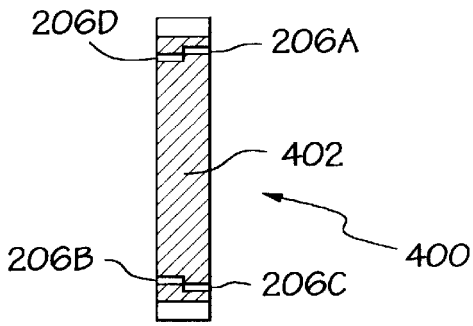
FIG. 17 is a sectional view of the baffle of FIG. 16 taken along lines 17—17 thereof.

FIGS. 16 through 20 illustrate another embodiment of a baffle in accordance with this invention, designated 400, which is a liquid barrier and may be used in lieu of the dam or barrier 31 mentioned above. With particular reference to FIGS. 16 and 17, the baffle 400 comprises a dam member 402 constructed to be substantially identical to the head 204 of the baffle 100, which is shown in detail in FIGS. 10 and 11. Therefore, like parts and features are given like reference numbers. The dam member 402 could be molded alone as described above with regard to the baffle 100 or it could be formed by cutting away the blade of an existing baffle 100.

Figure 18:
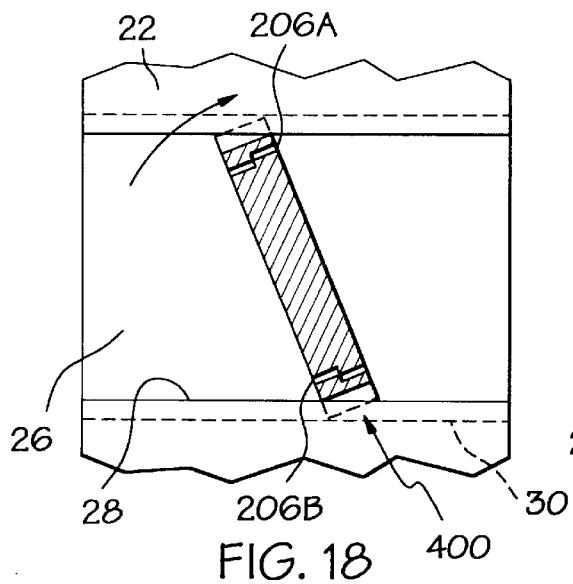
FIGS. 18 and 19 are fragmentary side views of a mold insert showing the baffle of FIG. 16 being inserted into a liquid conduit groove in a mold insert, the liquid barrier being shown in cross section.
Figure 19:
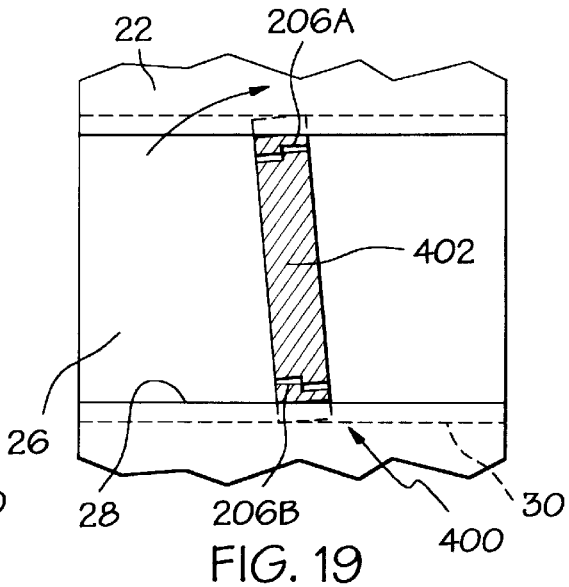
Figure 20:
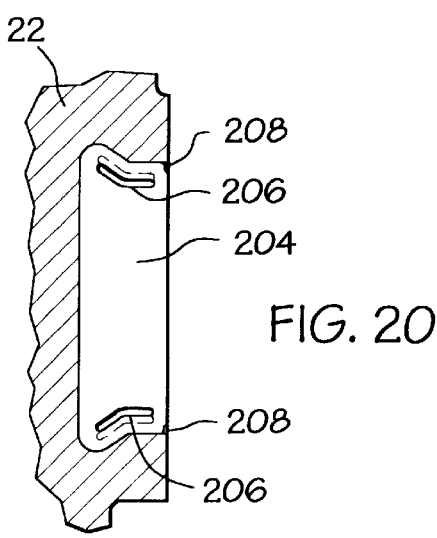
FIG. 20 is a fragmentary view, with parts in cross section, showing the baffle locked in place in the liquid conduit groove of the mold insert of FIGS. 18 and 19.

With particular reference to FIGS. 18 and 19, the dam member 402 is secured in the liquid conduit groove 26 in the same manner as the baffle 100. Particularly, the dam member 402 is located at the desired location within the liquid conduit groove 26 and is then rotated to lock it into place. Of course, the dam member 402 could also be configured as the head 104 of the baffle 100 (FIG.3).

Although the presently preferred embodiments of this invention have been described, it will be understood that within the purview of the invention various changes may be made within the scope of the following claims.

Having thus described our invention, we claim:

1. A baffle for use in cooling or heating a solid component, said solid component having a liquid-receiving bore extending transverse to and opening to a liquid conduit formed in said component, said baffle comprising:

a blade adapted to be received within said liquid-receiving bore, said blade having a width substantially equal to the width of said bore so that said blade would, if inserted into said bore, divide said bore into a liquid inlet passageway and a liquid outlet Passageway by said blade so that liquid flowing into said liquid inlet Passageway would flow into said liquid outlet passageway around the end of said blade at the innermost end of said bore;

a plurality of first fins projecting outwardly from a first face of said blade for restricting flow of liquid through said liquid inlet Passageway, each of said first fins having a first margin connected to said first face that extends parallel to said first face, said first margin extending from a side edge of said first face and spaced from the opposite side edge of said first face, alternate ones of said fins extending from respective opposite side edges of said first face; and a plurality of second fins projecting outwardly from a second, opposite face of said blade for impeding flow of liquid through said liquid outlet Passageway, each of said second fins having a first margin connected to said second face that extends parallel to said second face, said first margin thereof extending from a side edge of said second face and spaced from the opposite side edge of said second face, alternate ones of said second fins extending from respective opposite side edges of said second face.

2. The baffle of claim 1 further comprising a head located at one end of said blade, said head being threaded for engagement with a wall of said liquid conduit.

3. The baffle of claim 1 wherein said first margin of each of said fins is linear, and wherein each of said fins is wedge-shaped having a second linear margin intersecting said first linear margin, said first and second linear margins connected by a third, outer margin, and wherein the second linear margin of each of said fins extends outwardly from the face of said blade to which the first linear margin thereof is connected, and the third, outer margin of each of said fins extends from the intersection of the first linear margin thereof with a side edge of said blade to the second linear margin thereof.

4. The baffle of claim 3 wherein the third, outer margin of each of said fins is arcuate.

5. The baffle of claim 4 wherein each of said fins projecting from the first face of said blade is aligned longitudinally with a corresponding fin projecting from the second, opposite side of said blade, and wherein the third, outer margins of the longitudinally-aligned fins extend from respectively opposite side edges of said blade.

6. The baffle of claim 5 wherein the fins projecting from each face of said blade are located at mutually longitudinally spaced locations, and wherein the third, outer margins of the mutually-spaced fins on each face of the blade extend from alternating side edges of said blade.

7. The baffle of claim 6 wherein adjacent, mutually-spaced fins projecting from the first face of said blade and the corresponding aligned fins projecting from the second, opposite face of said blade together with said blade appear, from an end of said baffle, to substantially form a circle.

8. A baffle for use in a mold insert for an injection molding machine, said mold insert having a liquid-receiving bore extending radially inwardly from a circumferential liquid conduit groove formed in said mold insert, said baffle comprising:

a body adapted to be received in a liquid-receiving bore; and a head connected to said body, said head having a size and shape to substantially block the flow of liquid in a liquid conduit groove when said body is received in said liquid-receiving bore, thereby directing said flow into said liquid-receiving bore, said head further being adapted for engagement with an undercut portion of said liquid conduit groove to releasably lock said baffle in position with said body received in said liquid-receiving bore, said head having first and second faces and first and second opposed side margins, said head having a first recess formed in the first face thereof adjacent the first side margin thereof, and said head having a second recess formed in the second face thereof adjacent the second side margin thereof, wherein said recesses cause the material forming said head surrounding said recesses to be resilient.

9. The baffle of claim 8 wherein said head further has a third recess formed in the second face thereof adjacent the first side margin thereof and a fourth recess formed in the first face thereof adjacent the second side margin thereof, and wherein said third and fourth recesses are laterally offset from said first and second recesses, respectively.

* * * * *